Jan. 15, 1963 L. J. LOVISEK 3,073,207
SCREW HAVING ROLL-FORMED THREAD FULLY FORMED
UP TO HEAD THRUST SURFACE THEREOF
Filed Jan. 26, 1959 2 Sheets-Sheet 2

INVENTOR.
Louis J. Lovisek
BY
Prangley, Baird, Clayton, Miller & Vogel
Attys.

U nited States Patent Office 3,073,207
Patented Jan. 15, 1963

3,073,207
SCREW HAVING ROLL-FORMED THREAD FULLY FORMED UP TO HEAD THRUST SURFACE THEREOF
Louis J. Lovisek, Ridgewood, N.J., assignor to General American Transportation Corporation, Chicago, Ill., a corporation of New York
Filed Jan. 26, 1959, Ser. No. 788,878
2 Claims. (Cl. 85—48)

The present invention relates to screw fasteners and to methods of making the same, and more particularly to improved headed screw fasteners having rolled threads on the shanks thereof and to improved methods of rolling such threads. This application is a continuation-in-part of the copending application of Louis J. Lovisek, Serial No. 720,973, filed March 12, 1958, now abandoned.

Heretofore, most headed screw fasteners having rolled threads on the shanks thereof have been generally deficient and unsatisfactory for use in sheet material, particularly thin sheet material, because of the fact that the threads are not consistently extended on the shanks of the screws completely up to the underfaces of the heads thereof. Moreover, it has not been possible to attain uniformly perfect or full threads at or adjacent to the headed end of the fastener when forming threads on a headed screw blank by conventional thread rolling dies. Usually, the threads terminate from 1/32-inch to as much as 1/16-in, or more, short of the underface of the head, and the last thread, or few threads, are usually poorly and imperfectly formed, even when the best skill and care of the threading machine operator is exercised. Accordingly, such screws, particularly those of the so-called self-tapping type, are not capable of assuring good holding power in sheet material, and are commonly known in the trades as "spinners."

When rolling threads on headed screw blanks by means of conventional thread rolling dies, the dies cannot impress the threads all the way along the shank of the blank up to the head, since there is no place for the excess material to flow that is inherently created by the rolling operation; and consequently, excessive and extremely high pressures develop and tend to cause the top edges of the rolling dies to break or chip out, with consequent nonuniformity of and imperfections in the threads in the vicinity of the screw head.

In order to avoid this breakage or chipping out of the dies, it has become standard practice in thread rolling to chamfer the edges of the dies along their operative faces which lie next to the head of the blank during the rolling operation, and thus relieve the excessive pressures on the dies. This results in incomplete filling of the threads next to the screw head.

Accordingly, it is a general object of the present invention to provide an improved and simplified method of making headed screw fasteners.

Another object of the invention is to provide a headed screw fastener of improved construction and arrangement that is especially designed for use in thin sheet material.

In accordance with the method of the present invention, uniformly full threads can be consistently rolled all the way up to the head on a headed screw blank by initially forming an annular cavity or depression in the underface of the head immediately adjacent to its juncture with the shank of the blank, and then rolling the threads on the shank with thread rolling dies, either of the flat reciprocating type or of the rotary roller type, having edges that are not chamfered, and that thus do not relieve the pressure exerted against the dies by the rolling operation. This results in axial displacement or flow of all excess material into the cavity mentioned during the formation of the threads, producing fully and completely formed threads all the way along the shank of the screw up to the plane of the underface of the screw head and producing thread-like structure above the plane mentioned and within the cavity, with the uppermost of these threads continuing as a parial thread upon the structure noted, thereby assuring good holding power of such screws even in thin sheet material.

Screws embodying the present invention, and made by the present method, are uniformly superior to any heretofore available, and the thread rolling dies have a much longer life, all without depending upon any special skill or care of the operator of the thread rolling machine, and hence with consequent substantial reduction in the cost of production.

Further features of the invention pertain to the particular arrangement of the steps of the method and of the elements of the headed screw fastener, whereby the above-outlined and additional operating features thereof are attained.

The invention, both as to is organization and method of operation, together with further objects and advantages thereof, will best be understood by reference to the following specification taken in connection with the accompanying drawings, in which.

Figure 1:
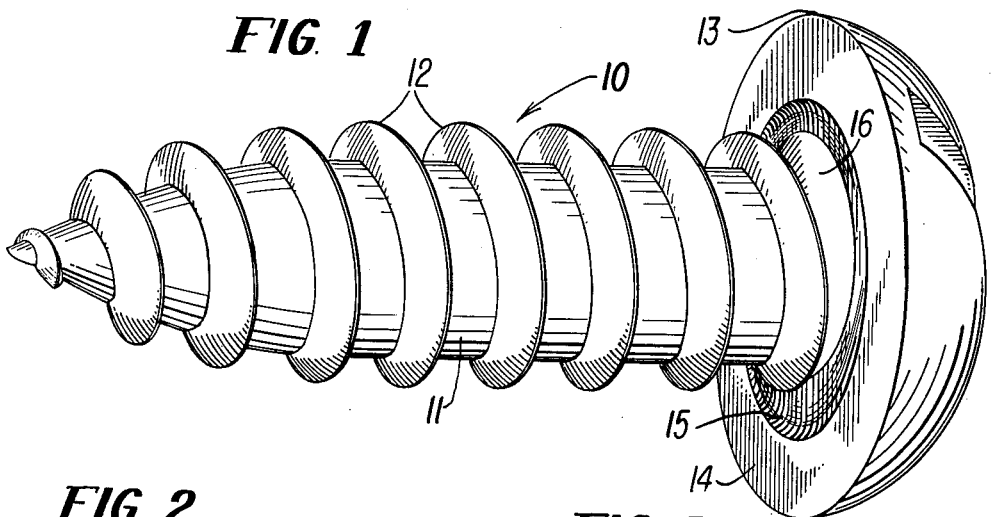
FIGURE 1 is a perspective view of a headed screw fastener embodying the present invention.
Figure 2:
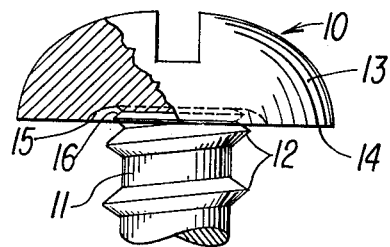
FIG. 2 is a reduced fragmentary side view, partly broken away, of the improved screw fastener shown in FIG. 1.
Figure 4:
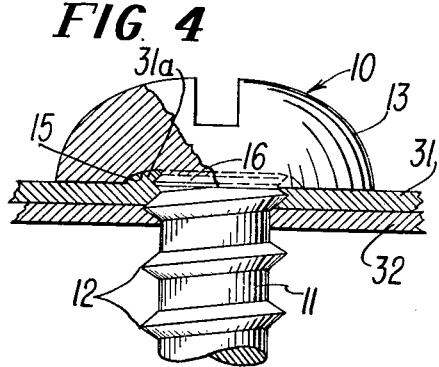
FIG. 4 is a view, similar to FIG. 2, and further illustrating in section a pair of thin sheets cooperating with the improved screw fastener, and tightly secured together thereby.

Referring now to FIGS. 1, 2 and 4 of the drawings, there is illustrated a headed screw fastener 10 of the self-tapping type and embodying the features of the present invention. The screw 10 comprises an elongated shank 11 having rolled threads 12 thereon, and a head 13 terminating one end of the shank 11 and provided with an underface including an annular thrust or bearing area 14 disposed in a plane substantially normal to the axis of the shank 11. The underface of the head 13 also has an annular cavity 15 formed therein and disposed radially inwardly from the thrust area 14 and positioned above the plane thereof and closely surrounding the junction between the one end of the shank 11 and the head 13. The rolled threads 12 are uniformly full and completely formed continuously on the portion of the shank 11 disposed below the plane of the thrust area 14 and terminate in a thread-like structure 16 carried by the one end of the shank 11 above the plane of the thrust area 14 and disposed in the annular cavity 15 adjacent to the junction between the one end of the shank 11 and the head 13. In the screw 10 the structure 16 is formed of excess material that is displaced from the shank 11 incident to the rolling of the threads 12 on the shank 11.

Reconsidering the construction of the screw 10, the plane of the thrust area 14 defines a shank lower portion disposed below this plane and a shank upper portion disposed above this plane, and the rolled threads on the shank 11 include the lower threads 12 carried by the shank lower portion disposed below the plane mentioned and the upper thread (the structure 16) carried by the shank upper portion and disposed in the annular cavity 15, the lower threads 12 being completely formed and the upper thread 16 being at least partially formed; and the lower threads 12 continue upwardly along the shank lower portion past the plane mentioned and terminate in the upper thread 16 on the shank upper portion.

In the construction of the screw 10, it will be understood that the specific form of the head 13 is not material to the present invention; however, in the illustrated construction the head 13 is shown as being of the slotted type. Similarly, in the screw 10, the specific form of the threads 12 is not critical, but it is preferable that they be of one of the numerous forms that are normally employed in self-tapping screws of this general type. Moreover the screw 10 may be formed of any of the usual materials from which screws of the self-tapping type are ordinarily formed, such, for example, as steel, etc.

Figure 3:
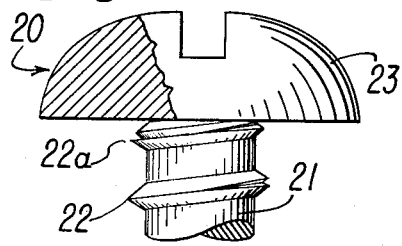
FIG. 3 is a fragmentary side view, partly broken away (similar to FIG. 2), of a conventional headed screw fastener.

Turning now to FIG. 3, a conventional screw 20 of the self-tapping type is illustrated that comprises a shank 21 carrying rolled threads 22 thereon and terminating at one end thereof in a head 23. In this conventional screw 20 only the rolled threads 22 that are disposed on the shank 21 and remote from the underface of the head 23 are uniformly full and completely formed, since it is inherent in the rolling step in which the threads 22 are formed that at least the uppermost thread disposed immediately adjacent to the underface of the head 23 be imperfect and only partially formed, as there is simply no place for the excess material from the shank 21 to flow in the rolling step, due to the interference of material flow by the head 23; and as illustrated, at least the uppermost thread is imperfectly formed, as indicated at 22a.

Referring now to FIG. 4, the improved screw 10 is illustrated in combination with upper and lower thin sheets 31 and 32 firmly secured together thereby, the sheets 31 and 32 being arranged in stacked relation. In this arrangement the shank 11 extends through aligned holes provided through the sheets 31 and 32 and the thrust area 14 of the head 13 is in firm engagement with the adjacent surface of the upper sheet 31. Also, an annular portion or bead 31a of the upper sheet 31 closely surrounding the hole therethrough is displaced upwardly therefrom into the annular cavity 15 and into engagement with the underface of the head 13 disposed above the annular cavity 15. Furthermore, the upper thread 16 (the structure 16) on the upper portion of the shank 11 engages the wall of the upper sheet 31 surrounding the hole therethrough, and at least one of the lower threads 12 on the lower portion of the shank 11 engages the walls of the sheets 31 and 32 respectively surrounding the aligned holes therethrough.

This arrangement is very advantageous in view of the fact that the composite frictional area of the head 13 in engagement with the adjacent surface of the upper sheet 31 is maximized by virtue of the displacement of the annular bead 31a of material of the upper sheet 31 into the cavity 15 and the contact thereof with the adjacent underface of the head 13 disposed above the annular cavity 15. Moreover, the structure 16 is in threaded engagement with the adjacent wall of the annular bead 31a, thereby holding the same in compression and firmly in place within the annular cavity 15. Furthermore, since the uppermost thread 12 provided on the shank 11 immediately below the structure 16 and merging thereinto is fully formed, it has an outside diameter and configuration corresponding to the remainder of the threads 12, so that this uppermost thread 12 disposed immediately below the structure 16 is in complete and tight frictional engagement with the adjacent walls of the sheets 31 and 32 respectively surrounding the aligned holes therethrough.

Accordingly, in the combination shown in FIG. 4 the sheets 31 and 32 are securely held together and tightly clamped in stacked relation by the improved screw 10, notwithstanding the fact that the combined thicknesses of the sheets 31 and 32 may be less than the pitch of the threads 12 on the shank 11; which arrangement has been illustrated for emphasis. Also, in this assembly, any suitable number of sheets of material may be firmly secured together, and the materials thereof are in no way critical, but usually such sheets are formed of metal, such, for example as steel, aluminum, etc.

Figure 5:
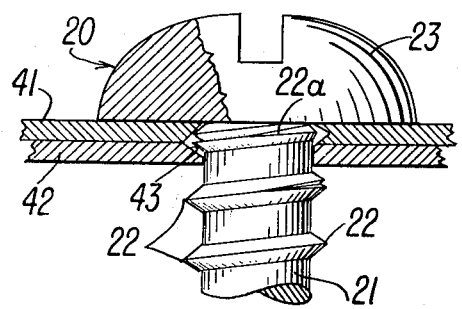
FIG. 5 is a view, similar to FIG. 3, and further illustrating in section a pair of thin sheets cooperating with the conventional screw fastener, and loosely secured together thereby.

Referring now to FIG. 5, the conventional screw 20 is illustrated in combination with upper and lower thin sheets 41 and 42 loosely secured together thereby, the sheets 41 and 42 being arranged in stacked relation. In this arrangement the shank 21 extends through aligned holes provided through the sheets 41 and 42 and the uppermost imperfectly formed thread 22a carried by the shank 21 immediately adjacent to the underface of the head 23 is loosely disposed in a threaded recess 43 provided through the aligned holes formed in the sheets 41 and 42; which threaded recess 43 has a diameter that is somewhat larger than that of the uppermost thread 22a and corresponding to the diameter of the lower threads 22. The diameter of the recess 43 is necessarily larger than that of the uppermost thread 22a, since it was formed in aligned holes in the sheets 41 and 42 by the self-tapping lower threads 22 carried by the shank 21; which lower threads 22 are necessarily of larger diameter than is the uppermost thread 22a for the reason previously mentioned.

Accordingly, the sheets 41 and 42 are only loosely secured together by the conventional screw 20, since the conventional screw 20 is capable of ready "spinning" in the recess 43 by virtue of the lack of fit of the recess 43 by the uppermost imperfectly formed thread 22a. Hence, in this combination illustrated in FIG. 5, wherein the combined thicknesses of the sheets 41 and 42 is less than the pitch of the threads 22 carried by the shank 21, the normal spinning of the conventional screw 20 is encountered, with the result that the sheets 41 and 42 are only loosely held together in stacked relation.

In screws of this character, the total area of the screw head, as established by the outside diameter thereof, is referred to as the "occupancy area"; the area of the underface of the screw head lying radially outwardly beyond the thread diameter thereof is referred to as the "thrust area" or "bearing area"; and the area of the underface of the screw head which is in contact with the adjacent surface of the work-piece is referred to as the "frictional area." In the conventional screw 20, this frictional area is usually considered as the area of the underface of the head which lies radially outwardly beyond the thread diameter; whereas, in the improved screw 10, this frictional area comprises both the thrust area 14 thereof and also the area disposed above the annular cavity 15.

The important advantages of the improved screw 10 over the conventional screw 20 will be further emphasized by a comparison of certain of the structural characteristics thereof. Specifically, the occupancy areas of the two screws 10 and 20 may be assumed to be equal. The annular cavity 15 in the underface of the head 13 of the improved screw 10 is arranged so as to effect a minimum reduction of the thrust area 14 thereof, as compared with that of the conventional screw 20; whereby the thrust area 14 of the improved screw 10 is ordinarily in the range 70% to 96% of that of the conventional screw 20. The frictional area of the improved screw 10 is ordinarily from about 115% to about 165% of that of the conventional screw 20. In other words, while the thrust area 14 of the improved screw 10 is somewhat smaller than that of the conventional screw 20, the frictional area of the improved screw 10 is substantially greater than that of the conventional screw 20; and of course, the frictional area is the area that determines the amount of vibration the assembly can absorb without loosening of the screw.

Figure 7:
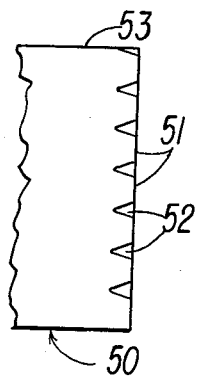
FIG. 7 is a fragmentary end view of the thread rolling die shown in FIG. 6.
Figure 6:
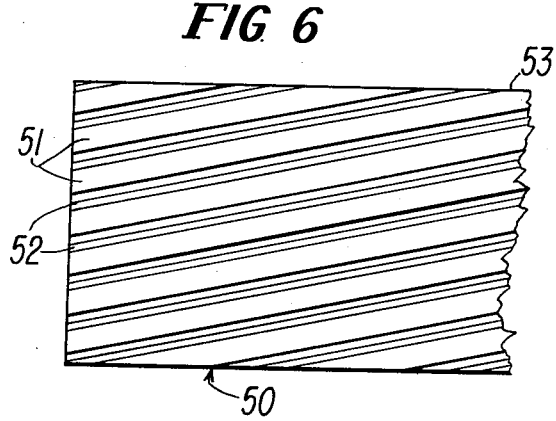
FIG. 6 is a fragmentary plan view of an improved thread rolling die that is employed in the present method of making the improved screw fastener, as shown in FIGS. 1, 2 and 4.

Turning now to the present method of making the improved screw 10, there is employed the improved thread rolling die 50 of the construction illustrated in FIGS. 6 and 7 that is provided with the threading ribs 51 and the intervening grooves or flutes 52 arranged in the usual skew pattern. In the construction of the die 50, the threading ribs 51 and the intervening flutes 52 extend completely to the top surface 53 thereof; whereby the die 50 is characterized by the absence of the usual chamfer adjacent to the top surface thereof.

In making the improved screw 10 in accordance with the present method, a fastener blank is provided having an elongated shank and a head terminating one end thereof; which head is also provided with an underface including a thrust area disposed in a plane substantially normal to the axis of the shank and having an annular cavity therein closely surrounding the junction between the one end of the shank and the head; which annular cavity also defines the surrounding annular thrust area in the plane mentioned on the underface of the head. The shank of the fastener blank is then subjected to the rolling operation, whereby the improved screw 10 of the construction previously described in conjunction with FIGS. 1 and 2 is formed. In this rolling step, utilizing the improved die 50, the lower portion of the shank 11 disposed below the plane of the thrust area 14 is subjected to pressure, while the pressure is relieved on the upper portion of the shank disposed above the plane mentioned; whereby the excess material displaced from the shank 11 incident to the rolling of the threads 12 thereon flows upwardly along the shank 11 onto the upper portion thereof disposed above the plane mentioned and into the annular cavity 15, thereby forming the thread-like structure 16 disposed above the plane mentioned and within the annular cavity 15 and constituting the upper thread 16 and continuation of the lower threads 12. By virtue of the provision of the annular cavity 15 in the underface of the head 13, unrelieved pressure may be maintained upon all of the shank 11 disposed in direct contact with the improved die 50, without chipping out or breaking of the die 50, and notwithstanding the fact that the upper edge of the improved die 50 is not provided with the usual chamfer.

Accordingly, in the rolling operation of the present method, the threads 12 provided on the lower portion of the shank 11 disposed below the plane of the underface of the head 13 are uniformly full and completely formed and the uppermost of these threads 12 continues as a partially formed thread above the last-mentioned plane into the thread-like structure 16 disposed within the annular cavity 15 and located above the plane mentioned. Hence, in effect, the composite thread on the shank 11 includes the lower section 12 and the upper section 16 and extends continuously along the shank 11 from below the plane of the underface of the head 13 upwardly thereabove and into the annular cavity 15.

In passing, it is noted that the improved thread rolling die 50 may be of either the flat reciprocated type, as illustrated, or it may be of the rotary type, both of these types of thread rolling dies being conventional in the screw-making art.

Figure 9:
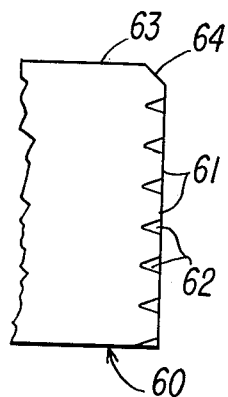
FIG. 9 is a fragmentary end view of the thread rolling die shown in FIG. 8.
Figure 8:
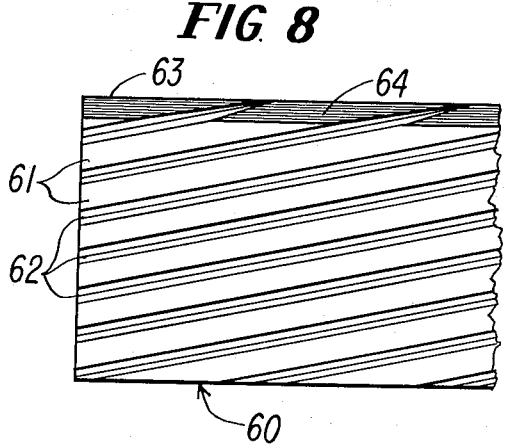
FIG. 8 is a fragmentary plan view of a conventional thread rolling die that is employed in a conventional method of making the conventional screw fastener, as shown in FIGS. 3 and 5.

Turning now to the conventional method of making the conventional screw 20, there is employed a conventional thread rolling die 60 of the construction illustrated in FIGS. 8 and 9 that is provided with the threading ribs 61 and the intervening grooves or flutes 62 arranged in the usual skew pattern. In the construction of the die 60, the threaded ribs 61 and the intervening flutes 62 extend adjacent to the top surface 63 thereof; whereat, they are relieved by the usual chamfer 64. This chamfer 64 is conventionally provided so as to provide some pressure relief upon the extreme upper end of the shank of the fastener blank adjacent to the underface of the associated head, since otherwise there is no place for the displaced material to flow incident to the formation of the threads thereon.

In making the conventional screw 20 in accordance with the conventional method, a conventional fastener blank is provided that includes the usual elongated shank and terminating head. The shank of the conventional fastener blank is then subjected to the rolling operation utilizing the conventional die 60, whereby the threads are formed thereon producing the conventional screw 20 of the construction illustrated in FIGS. 3 and 5. In this rolling step, the imperfectly formed uppermost thread 22a disposed immediately below the underface of the head 23 results from the provision of the chamfer 64 adjacent to the upper edge 63 of the conventional die 60; which arrangement is essential, since otherwise there is no place for the excess material displaced from the shank 21 to flow incident to the forming of the lower threads 22. Accordingly, the uppermost thread 22a is imperfectly formed and is of a diameter that is smaller than that of the lower threads 22, as previously explained.

In view of the foregoing it is apparent that there has been provided an improved method of making a headed screw fastener, as well as an improved headed screw fastener resulting therefrom. And also there has been provided an improved composite article of manufacture in the form of the plurality of thin sheets arranged in stacked relation and tightly secured together by the improved screw fastener, and notwithstanding the circumstance that the combined thicknesses of the thin sheets is less than the pitch of the threads on the shank of the improved screw fastener.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a headed screw having roll-formed threads of the same hand on the shank thereof and beginning at the lower end of said shank, and an enlarged head terminating the opposite end of said shank and having an underface and an indented portion above said underface adapted to be engaged by a tool for the screw to be rotated and advanced axially of said shank, the improvement in which the total underface of said head comprises a frictional area, including an outer thrust surface in a flat plane substantially normal to the axis of said shank and an annular cavity disposed radially inwardly from said thrust surface, the area of said thrust surface being 70% to 96% of that portion of said plane directly underlying said underface and said annular cavity being positioned above said plane and adjoining the junction of said underface and said shank radially inwardly of said roll-formed threads, whereby said plane is positioned below said junction and defines a shank lower portion disposed below said plane and including said lower end of the screw and a shank upper portion disposed above said plane, and said roll-formed threads of same hand continue from said lower end of the screw upwardly on said shank lower portion and include an uppermost roll-formed thread terminating at a thread-like roll-formed structure carried by said shank upper portion and disposed in said annular cavity closely adjacent to said junction, whereby said roll-formed uppermost thread of the roll-formed threads on said shank lower portion is available for the screw to engage firmly even a thin wall object against said thrust area of the screw when the screw is driven for the purpose by means of a tool applied to the indented portion of said screw head.

2. The headed screw set forth in claim 1, wherein said roll-formed threads on said shank lower portion are of the self-tapping type.

References Cited in the file of this patent

UNITED STATES PATENTS

| | | |
|---|---|---|
| 1,827,615 | Rosenberg | Oct. 13, 1931 |
| 2,024,070 | Sharp | Dec. 10, 1935 |
| 2,076,041 | Payne | Apr. 6, 1937 |
| 2,167,559 | Upson | July 25, 1939 |
| 2,263,137 | Oestereicher | Nov. 18, 1941 |
| 2,391,761 | Winn | Dec. 25, 1945 |